United States Patent [19]

Shivvers

[11] 4,063,654
[45] Dec. 20, 1977

[54] SWEEP AUGER APPARATUS

[76] Inventor: Charles C. Shivvers, Corydon, Iowa 50060

[21] Appl. No.: 603,344

[22] Filed: Aug. 11, 1975

[51] Int. Cl.² .............................................. B65G 65/30
[52] U.S. Cl. .................................. 214/17 DA; 302/50
[58] Field of Search .................... 214/17 DA, 17 DB; 302/50, 56

[56] References Cited

U.S. PATENT DOCUMENTS

| | | | |
|---|---|---|---|
| 1,275,558 | 8/1918 | Holmgreen | 214/17 DA |
| 1,482,524 | 2/1924 | Robinson | 214/17 DA |
| 3,050,201 | 8/1962 | Humphrey | 214/17 DA |
| 3,233,755 | 2/1966 | Glenn | 214/17 DA |
| 3,259,538 | 7/1966 | Schnyder | 214/17 DA |
| 3,403,795 | 10/1968 | Schaefer | 198/214 |
| 3,486,643 | 12/1969 | Smith | 214/17 DA |
| 3,487,961 | 1/1970 | Neuenschwander | 214/17 DA |
| 3,896,943 | 7/1975 | Knutsen | 214/17 DA |

Primary Examiner—Trygve M. Blix
Assistant Examiner—Charles E. Frankfort

Attorney, Agent, or Firm—Rudolph L. Lowell

[57] ABSTRACT

The sweep auger apparatus is radially mounted within a circular bin for storing granular free flowing material and is horizontally rotatable across the bin floor about a vertical axis located centrally of the bin to remove from the bin floor, during each horizontal rotation thereof, a uniform depth of material. The sweep auger is of a constant diameter and uniform pitch and is positioned within a housing structure of a generally right angle shape in transverse cross section that has an upright leg located adjacent the rear side of the auger and a generally horizontal leg arranged adjacent the top side of the auger and projected forwardly from the front side of the auger. The depth of material to be removed is dependent on the angle of repose or flow of the material relative to a horizontal plane. The front edge of the horizontal leg is vertically disposed and spaced forwardly of the auger front side such that the auger, during each horizontal rotation across the bin floor, is capable of removing all material flowing thereto from below the horizontal leg.

5 Claims, 8 Drawing Figures

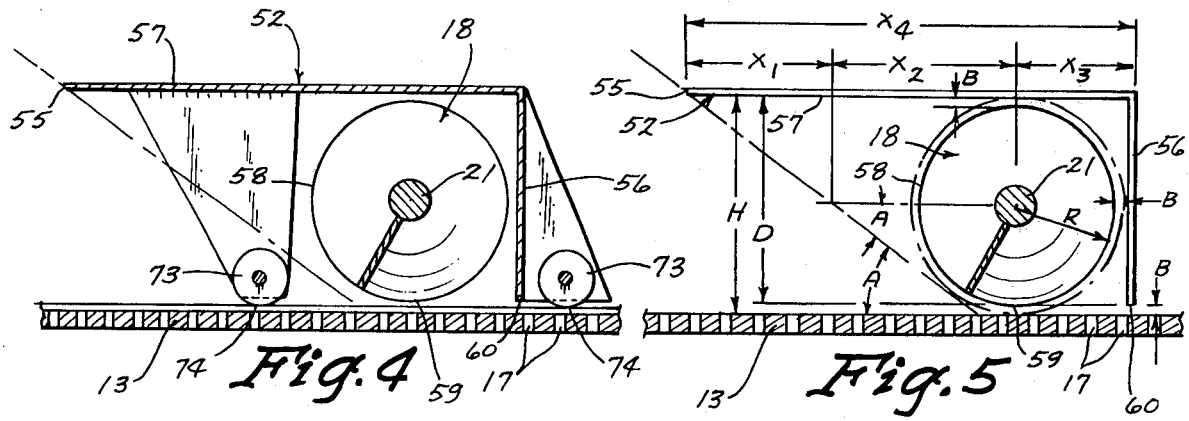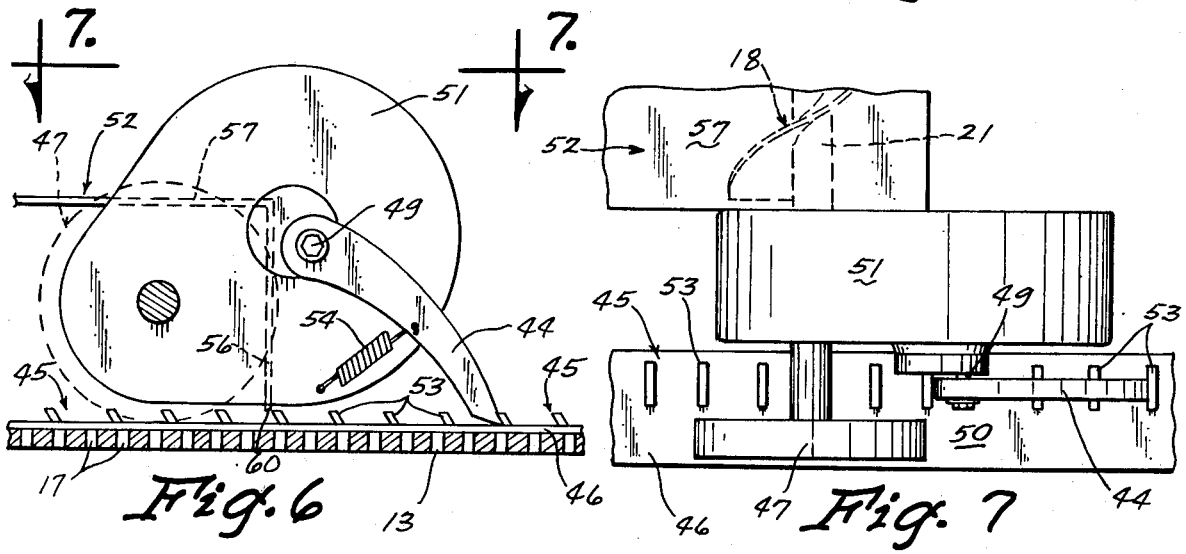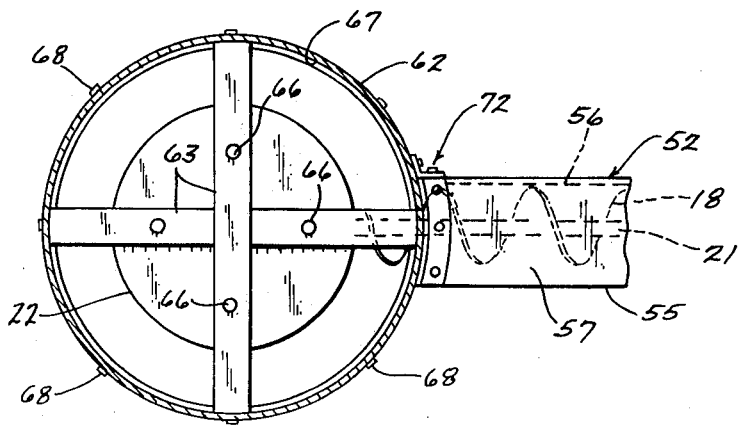

SWEEP AUGER APPARATUS

SUMMARY OF THE INVENTION

The sweep auger apparatus is of a compact and rugged construction and efficient in operation to remove, during each pass thereof across the bin floor, a uniform layer of material from adjacent the floor. Since a free flowing grain material such as corn, barley, soybeans and the like has an angle of repose or flow relative to a horizontal plane, the supply of material to the leading or front side of the auger can be limited or controlled to a volume flow within the capacity of the auger to handle the same. By utilizing the auger housing structure as a control to limit the material supplied to the auger, an auger of uniform diameter and pitch is capable of removing a uniform layer of the material from the bin floor. The augered material is directed to the center of the bin for delivery to a bin unloading auger located below the bin floor.

BRIEF DESCRIPTION OF THE DRAWINGS

FIGS. 4, 5 and 6 are enlarged sectional detail view taken on the lines 4—4, 5—5, and 6—6, respectively, in FIG. 3;

FIG. 7 is a plan view on line 7—7 in FIG. 6; and
FIG. 8 is a sectional view on line 8—8 in FIG. 2.

DETAILED DESCRIPTION OF THE INVENTION

Figure 3:
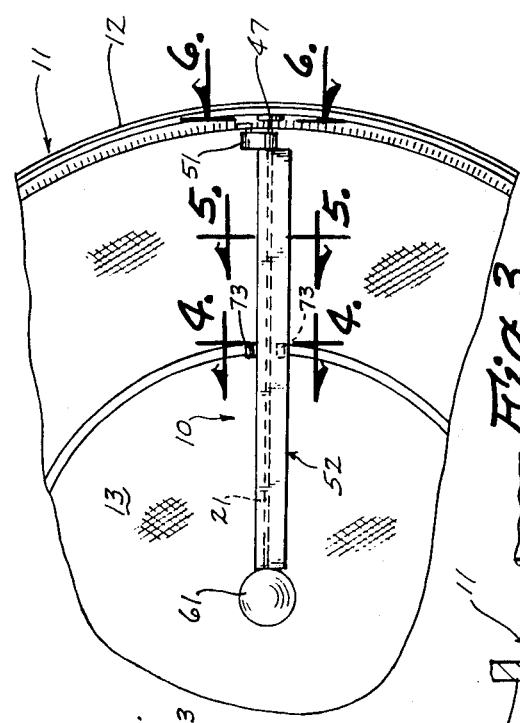
FIG. 3 is an enlarged plan view of the sweep auger apparatus as seen along the line 3—3 in FIG. 1.
Figure 1:
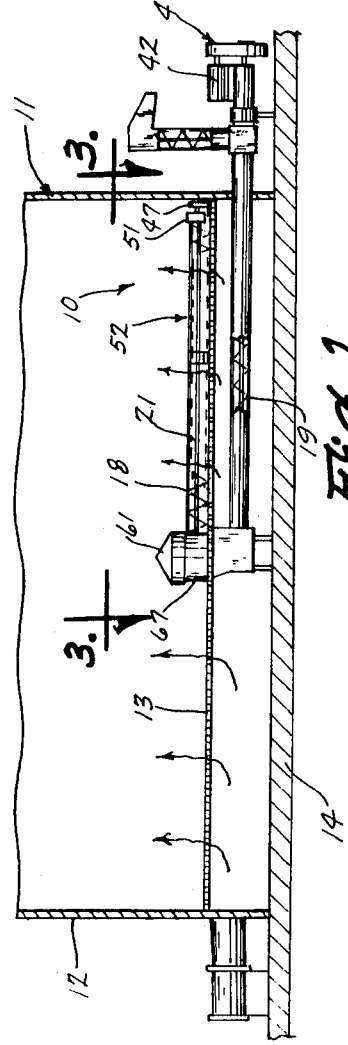
FIG. 1 is a side elevational view of the sweep auger apparatus of this invention shown in assembly relation with the floor portion of a circular bin.

The auger apparatus of this invention, indicated generally at 10, is illustrated in FIG. 1 in assembly relation with a circular grain storage bin 11 having a side wall 12 and a false bottom wall or floor 13 spaced above a bin foundation 14. The floor 13 is formed with a central opening 16 and is perforated, as indicated at 17, to provide for ventilation upwardly therethrough of either atmospheric or heated air. The apparatus 10 includes a radially extended sweep auger 18 which is rotatably mounted within the ball 11 immediately adjacent to the floor 13. The auger 18 is adapted to be rotated about its own axis and also to travel or rotate across the floor in a horizontal plane to remove, during each horizontal revolution thereof, a uniform depth or layer of grain from adjacent the floor 13. The grain removed by the sweep auger 18 is delivered through the central opening 16 to a radially extended bin unloading auger 19 which is mounted on the foundation 14 beneath the bin floor 13 and operable to move the grain exteriorly of the bin.

As shown in FIG. 1, the sweep auger 18 includes a shaft 21 the inner end of which is extended through a gear housing 22 for rotatable support in bearings 23. The housing 22 is rotatably carried at 24 on a depending vertical shaft 26 that is rotatably mounted in a bearing 27 secured to a center plate 28 that forms part of an open frame fitted within the central opening 16 in the bin floor 13. The center plate 28 is integrally formed with radially extended arms 31, the outer ends of which are connected to a peripheral ring 32 that is secured to a shoulder or ledge 33 extended about the side wall of the central floor opening 16.

The upper end of the vertical drive shaft 26 is located within the gear housing 22 and has a bevel gear 34 in continuous meshed engagement with a bevel gear 36 mounted on the inner end of the sweep auger shaft 21. The lower end of the drive shaft 26 extends within a gear housing 37 mounted on the bin foundation 14 below the central floor opening 16. A bevel gear 38 mounted on the drive shaft 26 and located within the gear housing 37 is in continuous meshed engagement with a bevel gear 39 carried at the inner end of the unloading auger shaft 41 which is rotatably supported in bearings 40 on the housing 37. The outer end of the shaft 41 projects outwardly from the side wall 12 of the bin 11 for connection with a drive motor 42 through a belt and pulley assembly, indicated generally at 43. It is seen, therefore, that the auger shaft 41 functions as a drive shaft for the sweep auger 18 through the gears 38 and 39, shaft 26 and gears 34 and 36.

As mentioned above the sweep auger 18 concurrently with rotation about its own axis, namely, the axis of the shaft 21, is rotated or walked horizontally across the bin floor 13 about the axis of the shaft 26 by a drive ratchet 44 (FIGS. 2, 6 and 7) driven from the sweep auger shaft 21. The ratchet 44 is operatively associated with a tooth section 45 of a circular track 46 extended circumferentially of the bin floor 13 at a position adjacent to the bin side wall 12. Outwardly from the drive ratchet 44 the sweep auger shaft 21 rotatably carries a floor engaging wheel 47 which is ridable on a smooth section 50 of the circular track 46.

The drive ratchet 44 (FIGS. 6 and 7) is eccentrically mounted on a shaft 49, supported in a gear box 51, secured to the outer end of a housing structure 52 which extends longitudinally of and partially encloses the sweep auger 18. The shaft 49 is in a driven relation with the sweep auger shaft 21 in a gear ratio of about three to one through a suitable gear mechanism (not shown) located within the gear box 51. On rotation of the shaft 49 the drive ratchet 44 is movable into abutting engagement with successive teeth 53 formed in the track section 45 through the cooperative action of a retracting spring 54 and eccentric rotation of the drive ratchet 44.

As the sweep auger 18 is horizontally rotated, it functions in combination with the housing structure 52 to remove a uniform layer of grain from adjacent the bin floor 13. This is accomplished by utilizing the angle of repose of flow made by the grain with a horizontal plane and constructing the housing structure 52 to meter or control the supply of grain to the leading or front side 58 of the auger. Thus, referring to FIGS. 4 and 5, the housing structure 52 is of a right angle shape in transverse cross section so as to have an upright or vertical rear wall 56 and a horizontal top wall 57. The housing structure 52 (FIGS. 1 and 2) extends over the full length of the sweep auger 18.

The location of the front edge 55 of the top wall 57 vertically above the bin floor 13 and forwardly of the leading or front side of the sweep auger 18 and the location of the lower edge 60 of the rear wall 56 determines the depth of the layer of material to be removed by the sweep auger. The housing structure 52 and the sweep auger are thus constructed relative to the angle of repose of the material so that material supplied to the auger front or leading side 58 is within the capacity of the sweep auger to handle or remove the same during its rotation across the bin floor.

In the relative construction of the housing structure 52 and auger 18 to locate the top wall front edge in conformance with the repose angle of the grain material, reference is made to FIG. 5 wherein $X_4$ designates the width of the top wall 57; A the repose angle of the grain material; R the radius of the auger 18; H the vertical height of the housing top wall 57; and B the working clearance of the auger 18 with the housing structure 52 and bin floor 13. Also, as shown in FIG. 5, the width of the housing $X_4$ is equal to the sum of $X_1$, $X_2$ and $X_3$. In this relation, it is seen that:

$$X_1 = \frac{R + B}{\tan A} \quad (1)$$

$$X_2 = \frac{R + B}{\sin A} \text{ and} \quad (2)$$

$$X_3 = R + B \quad (3)$$

Since $X_4$ is equal is the sum of $X_1$, $X_2$ and $X_3$ then, by derivation:

$$X_4 = [\cot A + \csc A + 1](R + B) \quad (4)$$

Additionally, and with continued reference to FIG. 5, it is apparent that:

$$H = 2(R + B) \text{ and} \quad (5)$$

$$D = 2R + B \quad (6)$$

where D is the depth of grain to be removed during each revolution of the auger 18 across the bin floor 13.

Thus let is be assumed that R = 1.75 inches, B = 0.5 inches and A is 25°. From equation (4) above $$X_4 = [\cot (25°) + \csc (25°) + 1](1.75 + .5) = 12.399$$

and from equation (5)

$$D = 2(1.75) + .5 = 4$$

The front edge 55 of the housing top wall 57 is thus located ( 4 + .5) or 4½ inches above the bin floor and a distance of [12.399 − (3.5 + .5)] or 8.399 inches forwardly of the front side 58 of the auger 18. It is to be noted that the apex of the included angle A is located forwardly of the lower side 59 of the auger 18 so that the auger is capable of moving material only while it is being advanced across the bin floor. Although the housing structure 52 is shown as of a right angle shape in transverse cross section, it is apparent that the included angle between the top wall 57 and rear wall 56 may vary, since the controlling factors determinative of the uniform depth of material to be removed are the locations of the front edge 55 of the top wall 57 and the lower edge 60 of the rear wall 56.

As clearly appears from FIG. 5, the material entering the sweep auger 18 is only that material which is permitted to flow beneath the top housing side wall 57. It is seen, therefore, that the top side wall 57 defines the maximum amount of material that is supplied to the leading side 58 of the sweep auger 18 and with the material thus supplied to the auger being retained against travel rearwardly of the auger by the backboard action of the rear wall 56. It is apparent also that a uniform depth of material is removed by the auger apparatus 10 regardless of the rate of horizontal rotation of such apparatus about the bin 11 since the angle of repose A, defined by the front edge 55 of the top wall 57 and the bin floor 13 terminates at a position forwardly of the lower side 59 of the sweep auger 18.

Figure 2:
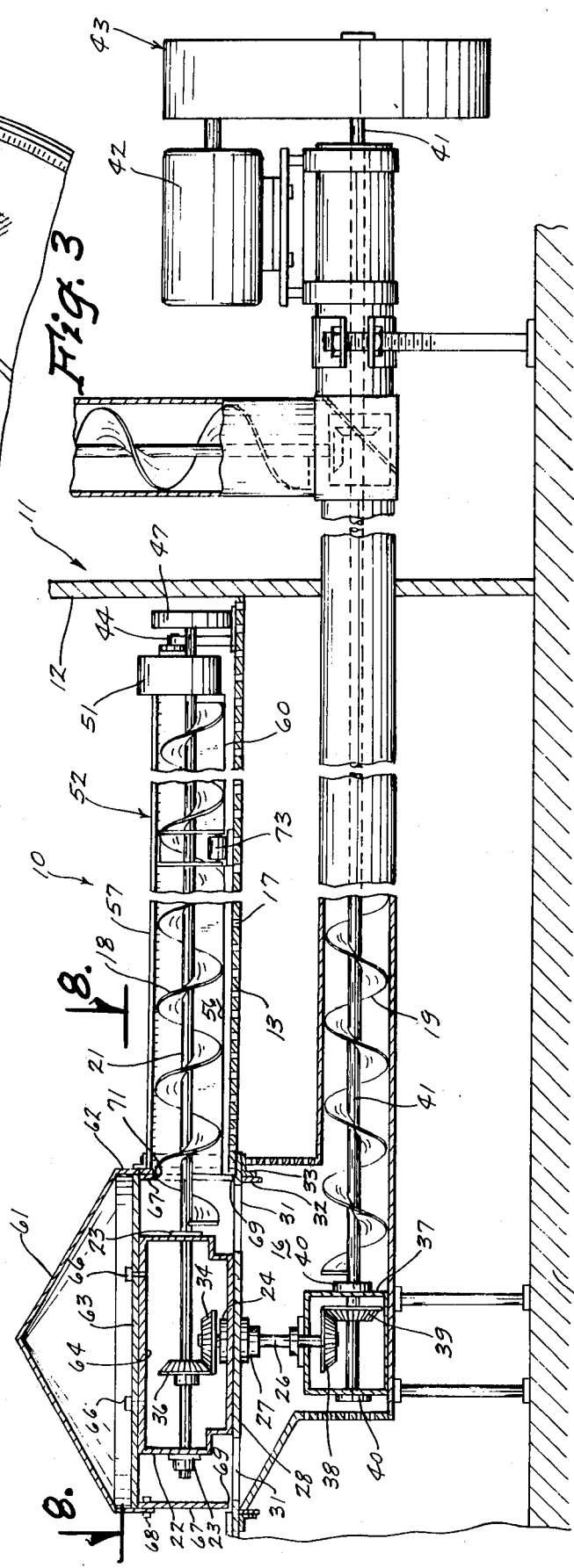
FIG. 2 is an enlarged foreshortened sectional view showing the assembly relation of the sweep auger apparatus with a bin unloading auger.

The material moved by the sweep auger 18 is delivered to the central opening 16 in the bin floor for pick up and removal from the bin 11 by the unloading auger 19 (FIG. 2). The gear housing 22 is provided with a cover or hood 61 of a generally inverted cone shape formed with a depending peripheral flange 62 concentrically spaced outwardly from the gear housing 22. A frame 63 of a cross arm shape fitted within and attached as by weldments (not shown) to the flange 62 is secured to the top wall 64 of the housing 22 by screws 66. An annular skirt 67 received within the flange 62 in abutting engagement against the frame 63 is attached to the flange by screws 68. The lower end 69 of the skirt terminates adjacent the ring member 32 to preclude material entering the opening 16 except at an auger receiving opening 71 formed in the skirt.

The inner ends of the top wall 57 and rear wall 56 of the housing structure 52 are secured to the skirt 67 by fastening devices indicated at 72. It is seen, therefore, that the housing structure 52 extends between and is connected to the skirt 67 and gear box 51. Arranged at opposite sides of the sweep auger and intermediate the ends of the housing structure 52 are a pair of housing supporting rollers 73 (FIGS. 2 and 4). As shown in FIG. 4, the lower sides 74 of the rollers project slightly below the lower edge 60 of the housing rear wall 56 for riding engagement on the material lying below such lower edge.

Although the invention has been described with respect to a preferred embodiment thereof, it is to be understood that it is not to be so limited since changes and modifications can be made therein which are within the full intended scope of this invention as defined by the appended claims.

I claim:

1. Apparatus for moving a horizontal layer of uniform thickness of a free flowing granular material along the bottom wall of a circular storage bin toward the center of the bin comprising:

a. A sweep auger extended radially of the bin having a forward leading side, a rear trailing side, a lower side, and a top side, b. means for rotating said sweep auger horizontally through said material and on said bottom wall about a vertical axis located centrally of the bin, and c. a housing structure for said sweep auger located below the level of the material in said bin and movable horizontally with the auger through the material, said housing structure having an upright rear wall adjacent the rear side of the sweep auger and a continuous top wall adjacent the top side of said sweep auger connected to and projected forwardly from the upper edge of said rear wall, d. said rear wall having a lower edge in a working clearance with the bottom wall of said bin, and said top wall having a material supporting upper surface and a front edge positioned forwardly of the leading side of the sweep auger a distance such that the apex of the angle of repose of the material vertically below said top wall is located forwardly of the lower side of the sweep auger when said front edge is in the plane of the upper surface of the material forming the angle of repose, whereby during each revolution of horizontal rotation of the sweep auger there is moved toward the center of the bin a horizontal layer of the granular material of a thickness substantially equal to the vertical distance between said front edge of the top wall and the lower side of said auger.

2. The apparatus for moving a horizontal layer of uniform thickness of a free flowing granular material along the bottom wall of a circular bin in accordance with claim 1 wherein:
   a. the thickness of the layer of granular material to be moved is determined in accordance with the following equations:
      1. $H = 2(R+B)$
      2. $X_4 = (\text{Cot } A + \text{Csc } A + 1)(R+B)$ and
      3. $D = 2R + B$ wherein A is the angle of repose of the granular material; B is the working clearance of the sweep auger with the bottom wall of the bin and with the rear wall and top wall of the housing structure, R is the radius of the sweep auger; H is the height of the housing rear wall; $X_4$ is the width of the top wall and D is the thickness of the layer of granular material to be moved.

3. The apparatus for moving a horizontal layer of uniform thickness of a free flowing granular material along the bottom wall of a circular bin in accordance with claim 1 including:
   a. a pair of roller means,
   b. means rotatably supporting said roller means on said housing structure intermediate the ends of said housing structure at positions to opposite sides of said sweep auger,
   c. said roller means rotatable about axes extended longitudinally of said housing structure with the lower sides thereof substantially at the level of the lower end of said rear wall.

4. The apparatus for moving a horizontal layer of uniform thickness of a free flowing granular material along the bottom wall of a circular bin in accordance with claim 1 wherein:
   a. the front edge of the top wall is vertically spaced from the bottom wall a distance at least as great as the distance any other section of the top wall is vertically spaced from the bottom wall.

5. The apparatus for moving a horizontal layer of uniform thickness of a free flowing granular material along the bottom wall of a circular bin in accordance with claim 1 wherein:
   a. the front edge of the top wall is spaced vertically from the bottom wall and spaced forwardly of the leading side of the sweep auger such that the sweep auger, during each horizontal rotation along the bottom wall, is capable of removing all material supplied thereto from below the forward edge of the top wall.

* * * * *